(12) United States Patent
Giallorenzi et al.

(10) Patent No.: US 8,023,530 B1
(45) Date of Patent: Sep. 20, 2011

(54) PHYSICAL LAYER QUALITY OF SERVICE FOR WIRELESS COMMUNICATIONS

(75) Inventors: Tom Giallorenzi, Sandy, UT (US); Eric Hall, Sandy, UT (US); Osama Haddadin, Salt Lake City, UT (US); Dan Watt, West Jordan, UT (US); James Dyal, South Jordan, UT (US)

(73) Assignee: L-3 Communications Corp., New York, NY (US)

( * ) Notice: Subject to any disclaimer, the term of this patent is extended or adjusted under 35 U.S.C. 154(b) by 118 days.

(21) Appl. No.: 12/349,706

(22) Filed: Jan. 7, 2009

(51) Int. Cl.
*H04J 3/16* (2006.01)
*H04W 72/12* (2009.01)
*H04L 12/26* (2006.01)

(52) U.S. Cl. ........ 370/469; 370/330; 370/252; 370/439; 370/412; 455/452.2

(58) Field of Classification Search .................. 370/342, 370/335, 252, 474, 329, 330, 439, 412, 469; 455/452.1, 452.2
See application file for complete search history.

(56) References Cited

U.S. PATENT DOCUMENTS

| | | | |
|---|---|---|---|
| 5,724,383 A | 3/1998 | Gold et al. | |
| 5,966,373 A * | 10/1999 | Stephenson et al. | 370/335 |
| 6,285,681 B1 | 9/2001 | Kolze et al. | |
| 6,807,154 B1 | 10/2004 | Malmgren et al. | |
| 6,829,317 B2 | 12/2004 | Mege et al. | |
| 6,879,561 B1 | 4/2005 | Zhang et al. | |
| 6,999,432 B2 | 2/2006 | Zhang et al. | |
| 7,027,484 B1 | 4/2006 | Tiedemann, Jr. | |
| 7,197,022 B2 * | 3/2007 | Stanwood et al. | 370/337 |
| 7,200,154 B1 * | 4/2007 | Wu et al. | 370/468 |
| 7,423,968 B2 * | 9/2008 | Stephens | 370/235 |
| 7,436,857 B2 * | 10/2008 | Fong et al. | 370/498 |
| 7,839,892 B2 * | 11/2010 | Eckert et al. | 370/469 |
| 2004/0028078 A1 * | 2/2004 | Beckmann et al. | 370/469 |
| 2007/0064669 A1 * | 3/2007 | Classon et al. | 370/347 |
| 2007/0189235 A1 * | 8/2007 | Chandra et al. | 370/335 |
| 2008/0123531 A1 * | 5/2008 | Gerkis | 370/235 |
| 2008/0130612 A1 * | 6/2008 | Gorokhov et al. | 370/342 |
| 2008/0165805 A1 * | 7/2008 | Terry et al. | 370/474 |
| 2008/0209297 A1 * | 8/2008 | Chandra et al. | 714/748 |
| 2008/0268918 A1 * | 10/2008 | Dominique et al. | 455/574 |

OTHER PUBLICATIONS

Srivastava et al., "Using Game Theory to Analyze Wireless Ad Hoc Networks", Virginia Polytechnic Institute and State University, Blacksburg, Virginia.
P. Venkitasubramaniam, Ting He and Lang Tong. "Relay Secrecy in Wireless Networks with Eavesdroppers". 44th Allerton Conference on Communication, Control and Computing, Sep. 2006.
Neel, "How Does Game Theory Apply to Radio Resource Management?", PhD dissertation, Virginia Tech.

* cited by examiner

*Primary Examiner* — Kwang B Yao
*Assistant Examiner* — Candal Elpenord
(74) *Attorney, Agent, or Firm* — Kirton & McConkie; N. Kenneth Burraston

(57) ABSTRACT

Physical layer quality of service is provided for a wireless communication system by operationally adapting the physical layer format to the quality of service requirements of transmitted data. The physical layer formats for the data packets are selected based on the quality of service requirements of the data packets. Control information defining the formats is transmitted across the wireless communication link and the data packets are transmitted using the selected physical layer formats.

28 Claims, 5 Drawing Sheets

PHYSICAL LAYER QUALITY OF SERVICE FOR WIRELESS COMMUNICATIONS

FIELD

The present application relates to wireless communications. More particularly, the present application relates to wireless communications systems having an operationally-adaptive physical layer.

BACKGROUND

Wireless communications is becoming increasingly important, with wireless systems finding their way into every growing numbers of applications. At the same time, increasing demands are being made on wireless communications systems. Modern telecommunications systems are often expected to handle a wide variety of data types. For example, communications systems may be asked to carry voice, computer data, image files, video, and similar types of data. Such communications systems are sometimes referred to as multimedia communications systems. In some cases, communications systems that were initially designed to carry only one type of data are being asked to carry additional types of data. For example, cellular voice systems have extended to include data transmission (e.g., text messaging and email) and are now being further extended to provide internet access and video transmission.

The differing data types in a multimedia communication system often have different requirements as to how they are handled by the system. For example, voice data is typically quite sensitive to latency, and end-to-end transport delays of less than about 150 milliseconds are often desirable. Voice data is also relatively tolerant of errors, and thus occasional transmission errors are typically acceptable. In contrast, computer data can have widely varying requirements, depending on the application. Some data is relatively time insensitive, and delays of many seconds are acceptable, while other data is worthless if not received within fractions of a second. Computer data must often be transferred error free. In additional to latency and error rate, other performance characteristics are often important in a communication system.

The term "quality of service" (QoS) refers to system performance characteristics that are desired. For example, QoS requirements can be defined in terms of performance characteristics such as data rate, transport delay, transport delay variability (jitter), data (packet) loss probability, data bit error probability, undetected error rate, round-trip delay, or like characteristics. While the foregoing parameters are primarily applicable to digital data, QoS characteristics can be defined in terms more traditionally associated with analog signals, such as signal-to-noise ratio, signal-to-interference ratio, transport channel frequency response, level of echo, and like characteristics. The foregoing list is not intended to be exhaustive, and other performance characteristics not mentioned above may be included within the definition of a particular QoS.

Wireless communications systems can prove particularly challenging when used for multimedia communications. The wireless communication channel is inherently unreliable and changing, and can experience errors, loss of data, interference, as well as significantly differing conditions on paths to different sources and destinations. Considerable research and development has been expended in addressing these challenges. While optimal solutions are known to some theoretical communications problems, most systems designs have generally represented a number of sub-optimal compromises. In particular, most wireless system designs have been optimized for one particular type of data, and provide sub-optimal performance when used for other types of data. Most wireless systems deployed to date use a fixed physical layer format, which is optimized for one data type, and other data types are made to fit within the system characteristics. While such designs have achieved significant market success, there is increasing desire for wireless communications systems to provide good performance for a mixture of data types.

SUMMARY

It has been recognized that it would be advantageous to develop a technique for operationally adapting a physical layer to the quality of service requirements of data packets during operation of a communication system.

In some embodiments of the invention, a method of physical layer adaptation during operation of a wireless communication link includes accepting data packets for transmission. Each data packet has a quality of service requirement specified by upper layers of a protocol stack. A physical layer frame format and temporal duration are selected for transmission of each data packet based on the associated quality of service requirement for the data packet. The data packets are transmitted over the wireless link using the selected physical layer frame format and temporal duration.

In some embodiments of the present invention, a system provides physical layer adaptation during operation of a wireless link. The system includes a means for accepting data packets for transmission, each data packet having an associated quality of service requirement. The system includes means for selecting a physical layer format for each data packet, means for transmitting a control frame to define selected physical layer frame formats, and means for transmitting data frame associated with the control frames using the selected physical layer frame formats.

In some embodiments of the present invention, a wireless transmission system provides operational physical layer adaptation when using a layered protocol stack. A queue in communication with an upper layer of the protocol stack accepts data packets. A frame selector coupled to the queue selects physical layer frame temporal duration based on quality of service requirements associated with the data packets. A transmitter coupled to the queue transmits control frames defining the selected physical layer format and transmits data frames having the data packets included therein, transmission occur via the wireless communication link.

In some embodiments of the present invention, a wireless reception system provides operational physical layer adaptation when using a layered protocol stack. A control frame receive receives control frames over a wireless communication link and a data frame receiver receives data frames over the wireless communication link. The data frame receiver uses frame format information determined by the control frame receiver.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Figure 1:
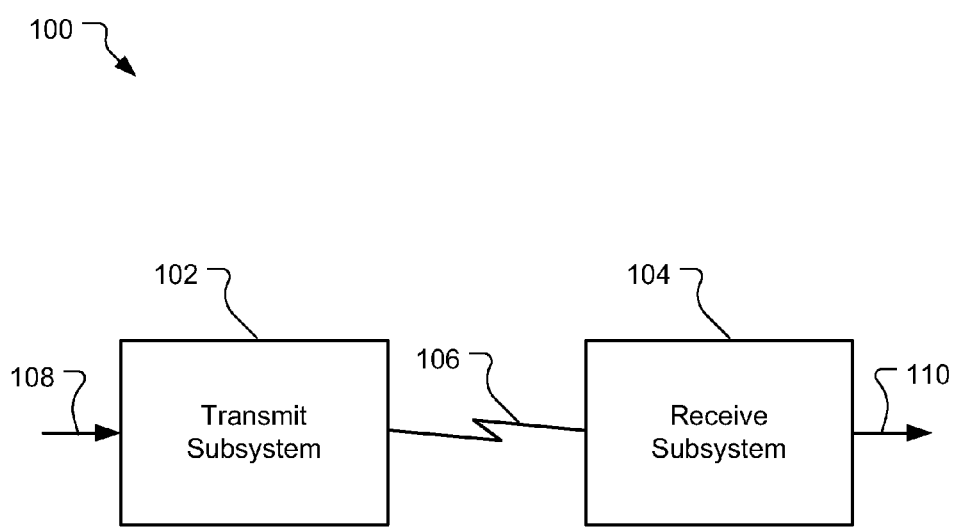
FIG. 1 is a high-level block diagram of communication system in accordance with some embodiments of the invention.

Reference will now be made to the example embodiments illustrated in the drawings, and specific language will be used herein to describe the same. It will nevertheless be understood that no limitation of the scope of the invention is thereby intended. Alterations and further modifications of the inventive features illustrated herein and additional applications of the principles of the inventions as illustrated herein that would occur to one skilled in the relevant art and having possession of this disclosure are to be considered within the scope of the invention.

One challenge in providing a particular quality of service through a communication system is the multiple and layered protocols that are implemented within typical communications systems. For example, typical computer networks exchange data using the Transmission Control Protocol (TCP) and Internet Protocol (IP), which defines various messages and routing functions for the exchange of data packets. TCP is sometimes referred to as a layer 4 protocol and IP as a layer 3 protocol, referring to the abstract seven-layer Open Systems Interconnect (OSI) model published by the International Organization for Standardization. TCP packets are typically embedded into IP packets, and referred to as TCP/IP packets. TCP/IP packets may be communicated using many different layer 2 protocols, including for example, IEEE 802.3, IEEE 802.11 MAC, Ethernet, ATM, etc., which in turn may operate over various layer 1 (physical layer) protocols, including for example, RS-232, 100 Base TX, IEEE 802.11 PHY, etc. These various protocol layers add complexity in providing network-level quality of service, since the different protocol layers in general have differing capabilities. Moreover, many practical system designs wish to accommodate a number of existing protocols, and thus designing a completely new protocol stack from scratch to achieve a particular set of system requirements is often undesirable.

One approach to providing quality of service over a wireless communication system is to provide a physical layer interface function that attempts to use a fixed physical layer format to provide the differing quality of service requirements desired by higher layers. In such an approach, the physical layer uses a preexisting design or is designed to optimize relay of a first type of data with a first quality of service capability. A second type of data, with differing quality of service requirements, is then accommodated by additional interface processing. For example, a low-reliability, low-latency physical layer may be designed to provide good performance for voice traffic. High reliability for data traffic may then be achieved by adding additional error correction coding and decoding and/or other error control techniques in a physical layer interface layer. The physical layer interface layer therefore adds in additional overhead that is grafted onto the basic physical layer processing. While such approaches are sometimes referred to in the art as a "physical layer adaptation," it will be appreciated that no operational adaptation or changing of the physical layer is involved.

While such an interface approach works in many circumstances, some situations cannot be as easily accommodated by adding the above-described type of physical layer adaptation layer. As an example, a high-latency physical layer cannot be easily adapted via additional upper layers to provide low-latency relay. More generally, depending on the characteristics of the fixed physical layer, it may difficult to satisfy a large range of diverse QoS requirements. Trying to design a fixed physical layer design that can simultaneously satisfy many different requirements (e.g., low latency, low error rate, high power efficiency) may prove extremely difficult or even impossible when certain constraints are imposed. For example, the Shannon theorem states bounds on the ability to provide reliable data transfer as a function of available signal to noise ratio.

Traditionally, wireless systems have used a fixed physical layer designed for a particular data format. In part, this has been driven by difficulty of implementing processing within the physical layer. Physical layer processing typically involves complex signal processing techniques that are to be implemented using limited processing power. While some systems have physical layer designs that can operate in multiple modes, typically, only a small number of physical layer parameters can be varied in existing systems. Moreover, typical wireless systems have used a fixed frame timing to simplify implementation and synchronization. Accordingly, the quality of service provided by current systems is typically limited to a small number of options.

It has been recognized by the present inventors that improved system performance can be obtained by a physical layer that is capable of operationally varying to adjust to the quality of service requirements of the data being transported by the physical layer. Instead of trying to force the data to fit into the constraints of a fixed formal physical layer, the physical layer can be changed dynamically during operation to fit the requirements of the data to be communicated. Some additional complexities can be incurred, such as providing a mechanism to keep a receiver informed as to the changing characteristics of the physical layer format (described further below). However, by incorporating the use of so-called software radio techniques, this complexity increase is manageable. Moreover, the benefits of providing a physical layer that can change formats so as to be optimized for a wide range of quality of service requirements is believed to provide sufficiently increased performance to justify the increased complexity in a number of applications. The changing format of the physical layer can be driven in real time based on the requirements of the actual data being transmitted. Accordingly, performance of the physical layer can vary in real time, adapting to the requirements of the actual data flowing through the communication system.

It is worth mentioning that changing the physical layer format on a real-time basis to accommodate data quality of service requirements is distinctly different (although compatible with) physical layer adaptation to accommodate channel conditions. In the latter, physical layer parameters (e.g., data rate or modulation format) are varied operationally to adapt to changing channel conditions. While such adaptation is driven by physical layer conditions, in embodiments of the present invention, the physical layer formats (described in further detail below) can be driven by quality of service requirements. In other words, variation at the physical layer can be driven primarily by higher layer data requirements in embodiments of the present invention. This does not, however, preclude also performing physical layer adaptation to accommodate channel conditions in some embodiments of the present invention, as described further below.

FIG. 1 provides a high-level block diagram of a system incorporating physical layer adaptation in accordance with some embodiments of the present invention. The system 100 includes a transmit subsystem 102 and a receive subsystem 104, which are in communication through a wireless link 106.

The transmit subsystem 102 accepts data packets for transmission from an upper layer of a protocol stack via input 108. Each data packet has an associated quality of service (QoS) requirement specified by the upper layer. For example, in some embodiments, the protocol stack can be compliant with protocols used on the Internet such as TCP/IP, UDP/IP, and the like. As a particular example, the IP protocol includes a type of service (TOS) field (also sometimes referred to as the differentiated services (DS) field) within the header portion of each IP packet, which can be used to implement QoS within IP networks. Various ways of using the TOS field are defined by the Internet Engineering Task Force, including, (1) allowing a packet to indicate its requirements with respect to delay, throughput, and reliability and (2) defining classes of service, which the network is preprogrammed to handle in predefined manners. Various other ways of identifying data packet QoS requirements can also be used, as discussed further below.

Based on the QoS requirements for each packet, the transmit subsystem 102 selects a physical layer frame temporal duration and format for transmission of each data packet. Multiple data packets having similar QoS requirements can be grouped together into the same frame for transmission, if desired. A data packet can also be broken into multiple frames for transmission. Various encoding operations can be performed on the data packets as will be described in further detail below. The transmit subsystem 102 places the data packets into physical layer frames, and transmits the physical layer frames over the wireless link 106 to the receive subsystem 104. The transmitter includes information defining the data frame format and temporal duration information. The receiver subsystem receives the physical layer frames, and using the information defining the data frame format and temporal duration, the receiver receives the data packets. The data packets are received and output via data output 110. While it is hoped that all of the physical layer frames will be received by the receive subsystem, some physical layer frames may be lost due to errors, interference, fading, and other factors well known to affect wireless communications channels. Accordingly, the receiver may not receive every data packet transmitted by the transmitter.

Figure 2:
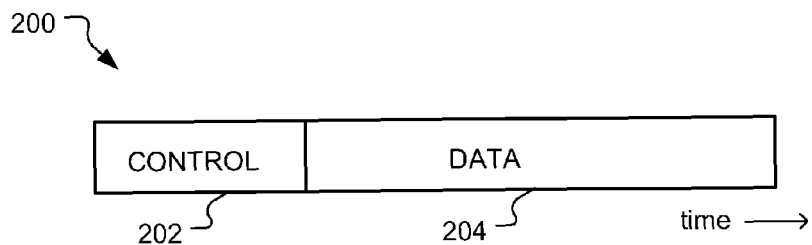
FIG. 2 is a high-level illustration of a physical layer format in accordance with some embodiments of the present invention.

FIG. 2 illustrates an example physical layer frame in accordance with some embodiments of the present invention. The physical layer frame 200 includes a control frame 202 and a data frame 204. The control frame includes information to define the selected physical layer frame format and temporal duration for the data frame. For example, the control frame can include information defining any one or more of a modulation type, a modulation symbol rate, a forward error correction coding type, a forward error correction coding control size, an automatic repeat request retransmission type, an interleaving type, an interleaving size, a spreading code rate, a spreading code format used during transmission of the data frame, and other parameters describing the operation of the physical layer. Depending on the data packet length, modulation type, modulation symbol rate, forward error correction coding, and other parameters, the temporal duration of the data frame can vary from data frame to data frame. Hence, the control frame specifies the data frame temporal duration. The duration can be specified in various ways, including using units of time, symbol count, bit count, and similar measures. For example, the duration can be specified in bits, and therefore the actual time length of the frame can be determined from the number of bits, modulation type, and modulation symbol rate. That is, the temporal duration equals the number of bits divided by the number of bits per symbol and divided by the symbol rate. Thus, a receiver can use the control frames to determine how to receive the data frames. As another example, the temporal duration can be an index value, which specifies one of a number of predefined lengths. As yet another example, special values (e.g., zero) can indicate a frame of indefinite length, for which the frame duration is determined using some other technique. For example, an indefinite frame length can end when another burst format header is sent.

In some embodiments of the present invention, the control frames and data frames can be multiplexed together on the same channel of a wireless link. For example, the channel can be defined by a particular carrier frequency, a particular spreading code, or a combination thereof. As another example, the channel can be defined by a time division multiplexing scheme in combination with a frequency division and/or code division multiplexing.

Figure 3:
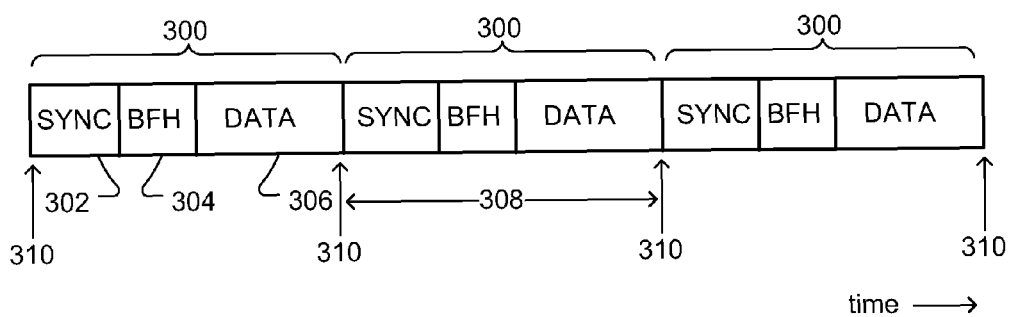
FIG. 3 is detailed illustration of a series of physical layer frames in accordance with some embodiments of the invention.

FIG. 3 illustrates a series of physical layer frames in accordance with some embodiments of the present invention. The physical layer frames 300 each include a synchronization field (SYNC) 302, a burst format header (BFH) 304, and one or more data packets (DATA) 306.

The synchronization field 302 is used by the receiver to synchronize to the physical layer frames 300. For example, the synchronization field can include a predefined modulation, a predefined data pattern, a predefined spreading code, and the like. The burst format header 304 functions as the control frame, and tells the receive what to expect for the rest of the frame. The data frame 306 includes one or more data packet(s). One data packet can be transmitted for each physical layer frame, or, if desired, multiple data packets having similar QoS requirements can be transmitted in the same physical layer frame. If desired, burst format headers can have no associated data frame on some occasions. For example, burst format headers indicating that there are no associated data frames following can be transmitted when there are no data packets to be transmitted across the communications link. If desired, the transmit subsystem can go idle after transmitting a burst format header that indicates there is no more data to follow until there is again data to be transmitted. Alternately, the transmit subsystem can repeatedly transmit burst format headers indicating there is no data.

While the synchronization field 302 and burst format header 304 can be fixed length, the data frame 306 is variable length. Thus, the temporal duration 308 of the physical layer frames 300 varies from frame to frame, and the frame boundaries 310 are at irregular times. As mentioned above, the temporal duration is a function of many factors, including the layer 2 data packet lengths provided to the transmitter and the physical layer format selected for the data frame.

An appropriate modulation format and other physical layer parameters for each frame are selected based on the desired QoS for the data packets of that frame. While many different mapping schemes between QoS requirements and physical layer parameters are possible, the following table provides one example:

| Example Data Type | Data QoS Requirements | Physical Layer Format |
|---|---|---|
| Ethernet packets | low error rate<br>latency insensitive | low order modulation<br>turbo coding |
| real-time imagery | high data rate<br>latency sensitive | low order modulation<br>block coding |
| voice | error tolerate<br>latency sensitive | high order modulation<br>parity check |
| file data | low error rate<br>low drop rate | turbo coding<br>cyclic redundancy check<br>automatic repeat request |
| sensor data | dropout tolerant<br>jam-resistant<br>time sensitive | high order modulation<br>cyclic redundancy check<br>spread-spectrum encoding |

For example, for latency insensitive data, powerful (yet decoding time intensive) error correcting codes like turbo codes (or low-density parity check codes) can be used to help provide low error rates. In contrast, for data that is less error sensitive, error checking, such as cyclic redundancy check (CRC) codes can be used to detect, but not correct errors. Automatic repeat request (ARQ) can be used to help ensure low packet loss rates, and can be combined with CRC to provide a powerful error-correcting scheme. Higher data rates can use higher-order modulation formats. These are just a few examples and many other combinations can be used.

Virtually any aspect of the physical layer can be varied from frame to frame, if desired. For example, the transmitter can vary modulation type (e.g. phase, amplitude, frequency, or combinations thereof), modulation format (e.g., number of bits encoded per symbol), forward error correction coding type (e.g, block, convolutional, turbo, low density parity check, etc.), decoding type (e.g., Viterbi, trellis, etc.), error control coding size (e.g. block length, constraint length), interleaving type (e.g. block, convolutional, hybrid), spreading code format (e.g. none, frequency hop, direct sequence), spreading code rate, spreading code format, use of automatic repeat request (e.g. none, go back n, selective repeat, etc.) etc.

If desired, a number of predefined frame formats can be provided. For example, for a system that can accommodate five different QoS types, five different sets of physical layer parameters can be defined, corresponding to each of the five different QoS. During operation, the format for each frame is determined dynamically by selecting one of the five predefined physical layer formats based on the QoS requirements of the data to be transmitted during each frame.

Alternately, using software radio techniques, one or more of the physical layer parameters can be continuously variable over a range of values. For example, a data rate can be variable continuously over a range of values, or can be varied nearly continuously (e.g., limited only by the resolution of a digitized value of the parameter being varied).

As mentioned above, a receiver may not correctly receive a frame due to wireless channel impairments. When this occurs, the receiver may not know where the start of the next physical layer frame 300 is, since it has lost the temporal duration information. One solution to this problem is for the receiver to search for the next sync field. In such a case, it is desirable to ensure that there is a low probability of falsely detecting the sync field when only data is being sent (e.g., making the sync field relatively long). Alternately, the burst format header 304 can provide information related to more than one of the data frames 306. Thus, increased robustness can be obtained by including information about more than one data frame 306 within each burst format header 304.

Figure 4:
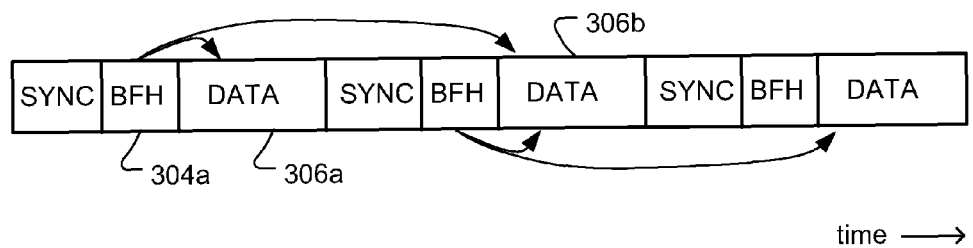
FIG. 4 is a detailed illustration of a series of physical layer frames in accordance with some alternate embodiments of the invention.

FIG. 4 illustrates a series of frames, where the burst format header 304a includes information about the data frame 306a immediately following the burst format header, as well as information about the data frame 306b following. Thus, if a frame is lost due to reception errors, the receiver will still have redundant information allowing it to know where to look for the next frame.

Figure 5:
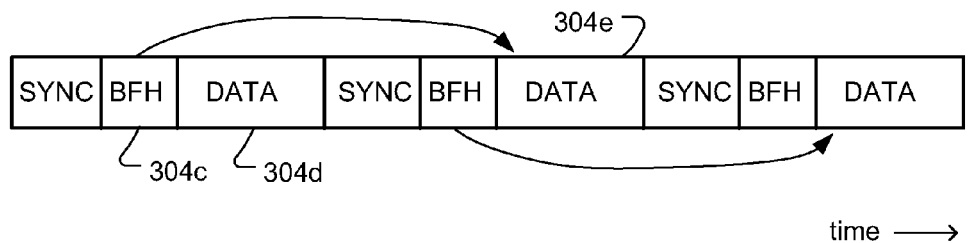
FIG. 5 is a detailed illustration of a series of physical layer frames in accordance with some additional alternate embodiments of the invention.

As another example, as shown in FIG. 5, burst format headers can include information one frame ahead of time. For example each burst format header 304c can include information about the data frame 304e following the next data frame 304d.

In general, format headers can include information about data frames one, two, three, or more frames in the future. This can allow one or more intervening control and data frames, for example, to provide additional time for the receiver to configure and initialize hardware and/or software used to decode the data frame. In general, burst format headers can include information defining the format of one or more data frames following the control frame after an interval of N interceding data frames, wherein N is a positive integer equal to or greater than 0 (i.e., N=0, 1, 2, 3 . . . ).

Errors in the reception of the burst format header 304 by the receiver 104 will likely result in the loss of the corresponding data frame 306 described by the burst format header. Accordingly, the burst format header can encode the frame format information using an error correcting code. For example, a robust block code can be used. This error correcting code can be different from error control coding (if any) that is used in the data frame. The burst format header can include a parity check, cyclic redundancy check, or other measures to help reduce the probability of an erroneously received burst format header being used.

Figure 6:
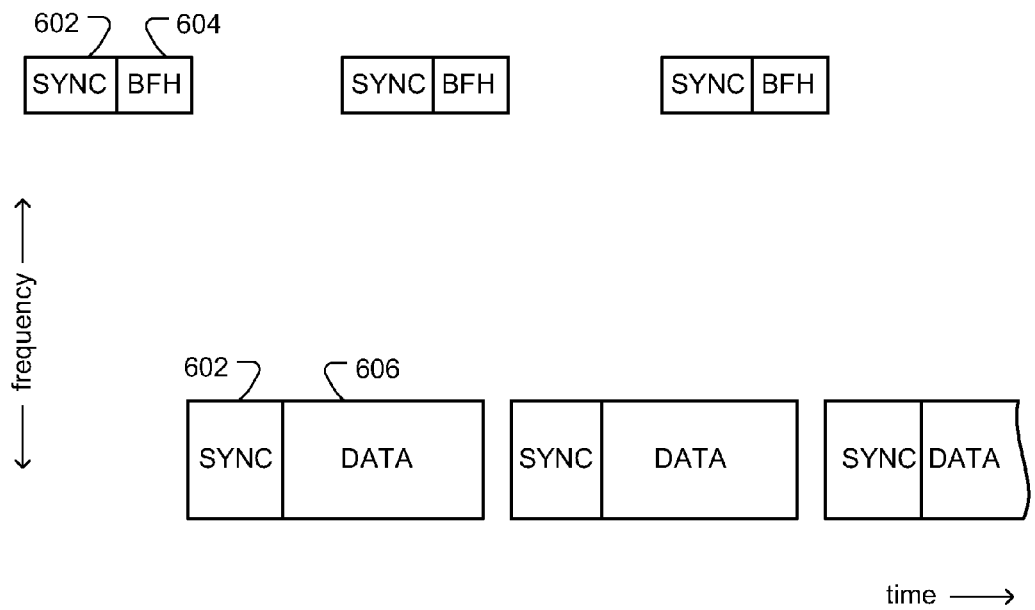
FIG. 6 is a detailed illustration of a series of physical layer frames in accordance with some additional alternate embodiments of the invention.

In some embodiments of the present invention, the control frames and data frames can be transmitted on different channels of a wireless link. For example, as shown in FIG. 6, control frames 604 can be transmitted using a first frequency (the control channel), and data frames 606 can be transmitted on a second frequency (the data channel). Each of the control frames and data frames can include a synchronization header 602.

As described above, control frames 606 can describe the format of the next data frame 604, or can describe the format where there are one or more intervening control frames and/or data frames as described above.

Generally, the transmission data rate of the control frames 604 can be less than of the data frames 606, hence the control channel can use less bandwidth and/or power than the data channel. For example, if the control channel is transmitted using approximately 10 dB less power than the data channel, the peak-to-average power ratio of an aggregate signal having both the control channel and data channel is only 0.4 dB. As another example, by transmitting the control channel with 15 dB less power than the data channel, the peak to average power ratio is reduced to 0.1. By maintaining a low peak to average power ratio, design of power amplifiers and other system components is simplified.

One advantage of transmitting the control frames on a different channel than the data frames is that maintaining synchronization at the receiver 104 can be simplified. In such a design, regular control frames can be transmitted in such a way that a receiver need not correctly receive every control frame to maintain synchronization. In contrast, on the data channel, because of the variable data frame temporal duration, a receiver that misses or incorrectly receives a control frame could lose frame synchronization on the data channel. However, the data channel timing is tied to the control channel; hence, by maintaining synchronization on the control channel, a receiver can also maintain synchronization on the data channel.

Another advantage of transmitting the control frames on a different channel than the data frames is that the control frame can be designed to be very resistant to errors. Generally, such increased error resistance results in high overhead, reducing the efficiency of a system. The control channel, however, being relatively low bandwidth to the data channel(s), represents only a small amount of overhead in the entire system. Hence, the control channel can include powerful error correcting codes.

Yet another advantage of transmitting the control frames on a different channel than the data frames is that, when no packet data is present to be transmitted, transmission of the data channel can be suspended while the control channel continues to be present. This can help to save power and/or interference within a system, without requiring resynchronization of the receiver when data transmission resumes, since the receiver can remain synchronized to the control channel.

Turning attention to the QoS aspects of the data packets being transmitted over the communications link, various of ways for determining the QoS requirements for the data packets can be used. For example, as mentioned above, IP provides a type of service (TOS) field within the header of every packet. In this example and similar situations, the transmit subsystem 102 (FIG. 1) can determine the QoS requirements from the packet header of each data packet provided on the input 108 to the transmit system.

As another example, some protocols include negotiation processes by which a QoS to be supplied is negotiated across a link. This negotiation can occur over the wireless channel, using data having its own associated QoS requirements. In such a case, the transmit subsystem 102 can be informed by the higher layers of QoS requirements associated with a particular data stream, through a control interface (not shown) to the transmit subsystem 102.

As another example, the QoS can be determined based on a source address, a destination address, a source port, a destination port, or combinations thereof, included within each data packet. As a particular example, within TCP/IP, ports are often associated with particular services. Port 20 is typically file transfer traffic (generally latency tolerant and error intolerant) while port 5060 is for voice over IP traffic (generally latency intolerant and error tolerant), and thus appropriate QoS requirements can be associated with the IP port of the source and/or destination.

Up to now, the discussion has focused solely on physical layer adaptation driven by the transmitter based on the QoS of the data packets being transmitted. However, as mentioned above, the selection of physical layer parameters can also include taking into account other factors. For example, channel characteristics, intended receiver capabilities, intended receiver status, transmitter status, and similar factors can also be factored into the selection of the physical layer format.

As a specific example, the communications paths between a transmitter and multiple receivers are often different. When transmitting from the transmitter to a nearby receiver, relatively little transmit power may be needed as compared to when transmitting from the transmitter to a distant receiver. Accordingly, the physical layer parameters can also be varied from frame to frame as a function of the channel conditions between the transmitter and the receiver. In a point to multipoint link, where different data packets are directed to different receivers, the physical layer format can thus be partially determined based on the wireless link conditions between the transmitter and the receiver at the destination of the data packet. Channel condition information can, for example, be provided by feedback from the receiver to the transmitter. Many different techniques for providing feedback on channel conditions and adapting the physical layer format to accommodate channel conditions can be incorporated into embodiments of the present invention.

For illustration purposes, one particular embodiment of a transmit subsystem 102 (FIG. 1) providing operational physical layer adaptation will now be discussed in conjunction with FIG. 7, although it will be appreciated that many other implementations are possible. The transmit subsystem 700 includes a queue 704 that receives data packets from an upper layer (or layers) of a protocol stack on a data input 702. As discussed above, the data packets have an associated quality of service (QoS) requirement specified by the upper layer(s), for example in the data packet header, based on source information, based on destination information, or otherwise made known to the transmit subsystem. Data packets 706 are processed by a frame type selector 708, which selects a physical layer frame temporal duration and format based on the associated quality of service requirement of the data packets. The frame temporal duration and format information 710 is provided to a transmitter 712, which transmits control frames and data frames via a wireless link 714, for example as described above.

If desired, the queue 704 can include or interface to a packet fragmentor 716, which fragments some packets into multiple data frames. For example, long, latency-insensitive data packets can be broken into smaller data packets, which are transmitted in multiple data frames over the physical layer. This can allow intervening latency-sensitive packets to be transmitted over the physical layer in between fragmented portions of the long data packet, helping to reduce latency for the latency-sensitive packets.

If desired, the queue 704 can be implemented as a priority queue (e.g., including multiple queues associated with different QoS requirements). This can provide differing queue delay for packets, depending on the associated QoS requirement. For example, a first queue 718 can hold latency-sensitive data, and a second queue 720 can hold latency-insensitive data. The transmitter 712 can then transmit preferentially from the first queue when latency-sensitive data is waiting for transmission, and only transmit the latency-insensitive data from the second queue when the first queue is empty. More complex queuing arrangements can also be used. For example, transmission order of data packets can be scheduled as packets come into the queue, the scheduling being based on the age of the data packets, latency tolerance (or other relevant QoS requirements), and current number of packets present in the queue(s). Various scheduling and queuing approaches can be used in embodiments of the present invention. The frame type selector 708 can also accept channel condition feedback information 722, which is taken into account in selecting the frame type, for example as described above.

Priority queues are just one example of many different queuing approaches that can be used to handle data having differing QoS requirements. If queues begin to approach capacity, overflow can be avoided using techniques such as random early detect (RED), weighted random early detect (WRED), weighted fair queuing (WFQ), per-flow fair queuing (PFFQ) and similar known techniques.

Figure 7:
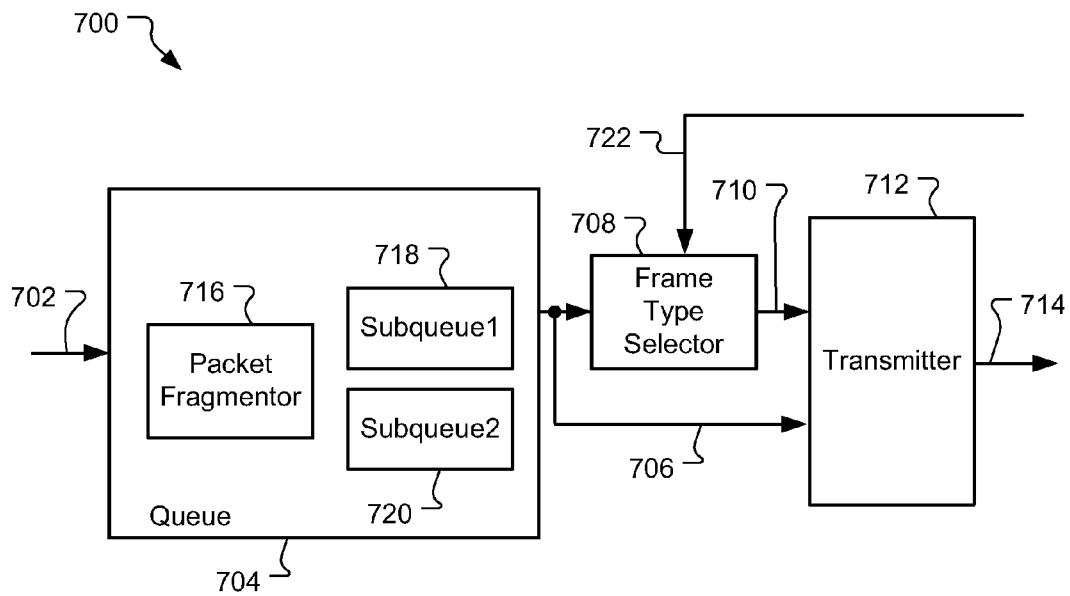
FIG. 7 is a detailed block diagram of a transmit subsystem in accordance with some embodiments of the invention.
Figure 8:
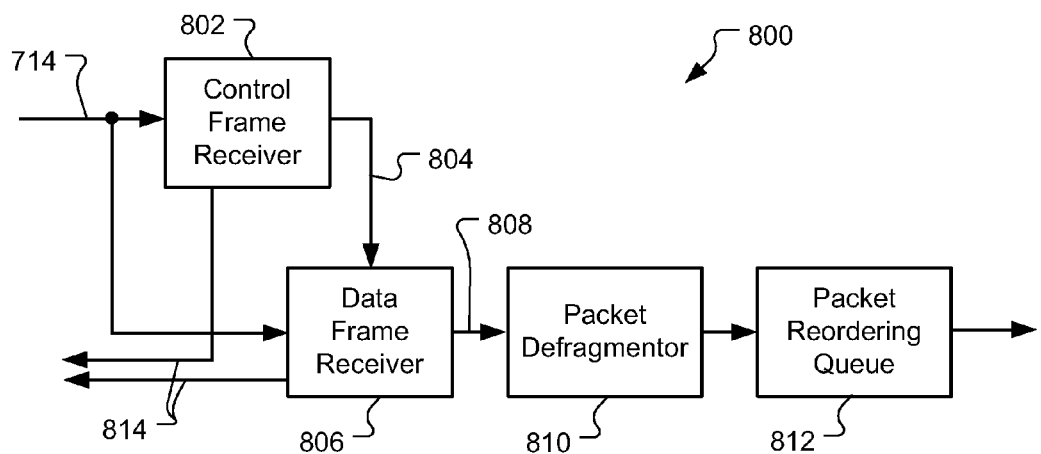
FIG. 8 is a detailed block diagram of a receive subsystem in accordance with some embodiments of the invention.

FIG. 8 illustrates one particular example implementation of a receive subsystem 104 (FIG. 1) compatible with the transmitter subsystem of FIG. 7. Many other implementations can be used. The receive subsystem 800 includes a control frame receiver 802 and a data frame receiver 806. The control frame receiver and data frame receiver functions can be combined in a single receiver, which receives the control frames and data frames at different times or on different channels. The control frame receiver receives the control frames on the wireless link 714, and determines physical layer parameters 804 from the control frame. The physical layer parameters are supplied to the data frame receiver. The data frame receiver receives data frames and outputs data packets 808. If desired, the receive subsystem can include a packet defragmentor 810 to reassemble fragmented packets if the transmitter includes a packet fragmentor. If desired, the receive subsystem can include a packet reordering queue 812 to reorder packets that may have had their order changed while waiting in the transmitter queue(s).

The control frame receiver 802 and/or data frame receiver 806 can provide feedback 814 information to the transmit subsystem, including for example channel condition information, automatic retransmission requests, and the like. The feedback information can be transmitted using a transmitter (not shown).

Figure 9:
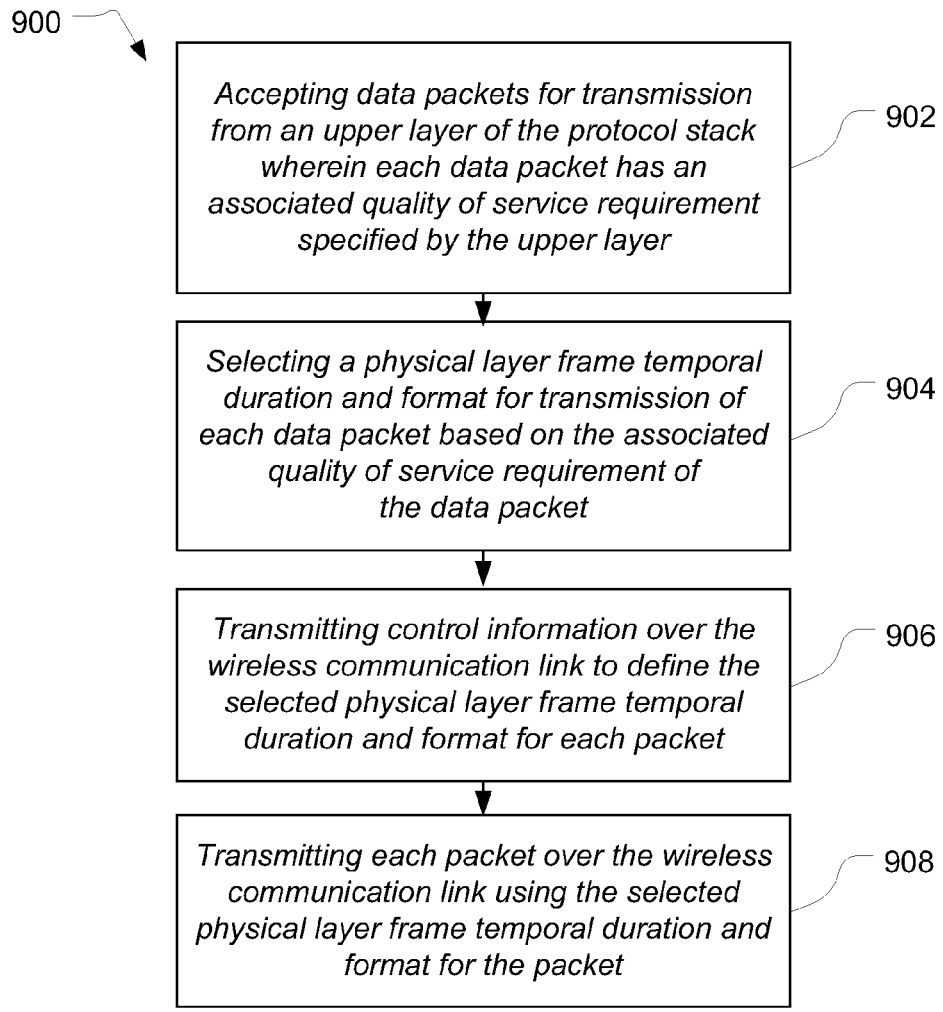
FIG. 9 is a flow chart of a method of physical layer adaptation during operation of a wireless communications link in accordance with some embodiments of the present invention.

A flow chart for a method of physical layer adaptation during operation of a wireless communication link is illustrated in FIG. 9. The method 900 can include accepting 902 data packets for transmission from an upper layer of the protocol stack. As describe above, each data packet can include an associated quality of service requirement specified by the upper layer. The data packets can be buffered or queued. The method can also include selecting 904 a physical layer frame temporal duration and format for the transmission of each data packet based on the associated quality of service requirement of the data packet. Various ways of selecting physical layer characteristics are described above.

The method can also include transmitting 906 control information over the wireless communication link to define the selected physical layer frame temporal duration and format for each packet, and transmitting 908 each packet over the wireless communication link using the selected physical layer frame temporal duration and format for the packet. The transmission of temporal duration and format and data can occur on the same or on different channels of the wireless communications link.

The discussion to this point has focused principally on a one-way point-to-point link between a transmit subsystem and a receive subsystem, although feedback from the receive subsystem to the transmit subsystem has been alluded to. It should be appreciated that the principles discussed so far can also be applied to each end of a bidirectional (transceiver) link. Moreover, the principles described herein can also be applied to a point to multipoint link. For example, the transmit subsystem can transmit to a plurality of receive subsystems, with individual data frames being directed to one or more of the receive subsystems. In such an application, data frames can even be transmitted on different channels, depending on the destination. For example, control frame transmissions can occur on one channel, and transmission of each data frame can be on one of a plurality of channels, the channel being selected to correspond to the destination of the data frame. Accordingly, embodiments of the present invention can be operated in point-to-point, hub-spoke, full mesh, partial mesh, and hybrid networks.

Many other variations on embodiments of the present invention are also possible. For example, while the control frame discussed so far has been described as having a fixed length, this is not essential. Variable length control frames can also be provided, providing even greater flexibility. For example, very short control frames can be defined where a small number of bits defines the most common data frame duration and formats, and then longer control frames can be used occasionally when needed to define a less commonly used data frame duration and format.

Implementation of the present invention can use hardware, software, or a combination of both. For example, conventional components can be used generating and converting radio frequency signals and digital components (e.g., field programmable gate arrays, application specific integrated circuits, digital signal processors, microprocessors, discrete digital logic components) can be used for processing digital signals. Software can be implemented in digital signal processors, microprocessors, or other software-controllable devices. Software can be stored in executable form in computer readable media, including for example, non-volatile memory and volatile memory.

Summarizing and reiterating to some extent, a technique for operationally varying the physical layer format of a communication system to provide quality of service control through the physical layer has been developed. The transmitter within the communication system can unilaterally make decisions regarding the physical layer format based on the quality of service requirements of the data being transmitted. This is in contrast to some conventional systems, which, while capable of changing the physical layer, must go through a lengthy negotiation between the transmitter and receiver to effect the change. By enabling changes in the physical layer format on every transmitted frame, embodiments of the present invention can provide true quality of service control at the physical layer. Potential advantages include improved communications performance, reduced power consumption, higher throughput, and the like. Operation of the system is somewhat more complex than a fixed physical layer, as the varying physical layer format and varying physical layer frame durations are transmitted across the physical layer. However, potential benefits appear to justify the increased complexity.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

The invention claimed is:

1. A method of physical layer adaptation during operation of a wireless communication link using a protocol stack comprising:

accepting data packets for transmission from an upper layer of the protocol stack wherein each data packet has an associated quality of service requirement specified by the upper layer;

selecting a physical layer frame temporal duration and format for transmission of each data packet based on the associated quality of service requirement of the data packet;

transmitting a plurality of control frames over the wireless communication link wherein the control frames each comprise control information to define the selected physical layer frame temporal duration and format for a following data frame, wherein transmitting the plurality of control frames comprises transmitting the control information on a first wireless channel; and transmitting a plurality of data frames over the wireless communication link each data frame comprising a corresponding packet and using the selected physical layer frame temporal duration and format for the packet, wherein transmitting the plurality of data frames comprises transmitting the packets on a second wireless channel, wherein the first wireless channel has a first frequency and the second wireless channel has a second frequency different from the first frequency.

2. The method of claim 1, wherein each data packet comprises a destination, and wherein selecting a physical layer frame temporal duration and format further is further based on wireless channel conditions associated with the destination of each data packet.

3. The method of claim 1 wherein transmitting the plurality of control frames comprises transmitting the control information to define the selected physical layer frame format for a current physical layer frame.

4. The method of claim 1 wherein the quality of service requirement corresponds to a type of service (TOS) parameter field of internet protocol (IP) packets in which the data packets are embedded.

5. The method of claim 1 wherein the quality of service requirement is determined from any of a source address, a destination address, a source port, a destination port, or a combination thereof.

6. The method of claim 1 wherein selecting a physical layer frame temporal duration and format comprises choosing values for at least one of the following physical layer parameters: a modulation type, a modulation symbol rate, a forward error correction coding type, a forward error correction coding control size, an automatic repeat request retransmission type, an interleaving type, an interleaving size, a spreading code rate, and a spreading code format.

7. The method of claim 6, wherein choosing values for at least one of the physical layer parameters comprises selecting one of a plurality of predefined physical layer parameter sets.

8. The method of claim 6, wherein the at least one of the physical layer parameters is continuously variable over a range of values.

9. The method of claim 1, wherein selecting a physical layer frame temporal duration and format for transmission of each data packet based on the associated quality of service requirement of the data packet comprises
breaking at least one of the data packets into a plurality of frames; and
placing the frames into a plurality of transmission queues based on the associated quality of service requirements.

10. The method of claim 9, wherein transmitting each packet over the wireless communication link comprises scheduling transmission from the plurality of transmission queues based on the associated quality of service requirements.

11. The method of claim 1, further comprising
receiving the control information over the wireless communication link; and
receiving the packets over the wireless communication link using the physical layer frame temporal duration and format defined by corresponding control information.

12. The method of claim 1, wherein selecting a physical layer frame temporal duration and format for transmission of each data packet is further based on characteristics of the intended receiver.

13. The method of claim 1, further comprising varying the temporal duration from frame to frame.

14. A method of physical layer adaptation during operation of a wireless communication link using a protocol stack comprising:
accepting data packets for transmission from an upper layer of the protocol stack wherein each data packet has an associated quality of service requirement specified by the upper layer;
selecting a physical layer frame temporal duration and format for transmission of each data packet based on the associated quality of service requirement of the data packet;
transmitting a plurality of control frames over the wireless communication link wherein the control frames each comprise control information to define the selected physical layer frame temporal duration and format for a following data frame; and
transmitting a plurality of data frames over the wireless communication link each data frame comprising a corresponding packet and using the selected physical layer frame temporal duration and format for the packet, wherein transmitting the plurality of control frames comprises transmitting control information to define the selected physical layer frame format for a physical layer frame to occur after N interceding frames, wherein N is a positive integer.

15. A method of physical layer adaptation during operation of a wireless communication link using a protocol stack comprising:
accepting data packets for transmission from an upper layer of the protocol stack wherein each data packet has an associated quality of service requirement specified by the upper layer;
selecting a physical layer frame temporal duration and format for transmission of each data packet based on the associated quality of service requirement of the data packet;
transmitting control information over the wireless communication link to define the selected physical layer frame temporal duration and format for each packet; and
transmitting each packet over the wireless communication link using the selected physical layer frame temporal duration and format for the packet, wherein:
transmitting the control information over the wireless communication link to define the selected physical layer frame format for each packet comprises encoding the control information using a first forward error correcting code; and
transmitting each packet over the wireless communication link using the selected physical layer frame temporal duration and format for the packet comprises encoding the packet using a second forward error correcting code.

16. A system providing for physical layer adaptation during operation of a wireless communication link using a protocol stack comprising: a means for accepting data packets for transmission from an upper layer of the protocol stack wherein each data packet has an associated quality of service requirement specified by the upper layer; a means for selecting a physical layer frame temporal duration and format for transmission of each data packet based on the associated quality of service requirement of the data packet, the means for selecting being coupled to the means for accepting data packets; a means for transmitting a control frame over the wireless communication link on a first wireless channel to define the selected physical layer frame format for each packet coupled to the means for selecting a physical layer frame temporal duration and format; and a means for transmitting a data frame associated with the control frame over the wireless communication link on a second wireless channel using the selected physical layer frame temporal duration and format for the packet, the means for transmitting being coupled to each of the means for selecting and the means for accepting, wherein the first wireless channel has a first frequency and the second wireless channel has a second frequency different from the first frequency.

17. The system of claim 16, wherein the control frame is separated from the associated data frame by at least one intervening other control frame and data frame.

18. The system of claim 16, wherein the means for selecting a physical layer frame temporal duration and format comprises means for selecting one of a plurality of predefined frame formats.

19. The system of claim 16, wherein the means for selecting a physical layer frame temporal duration and format comprises means for continuously varying at least one physical layer parameter.

20. The system of claim 16, wherein the means for selecting a physical layer frame temporal duration and format comprises means for determining a wireless channel condition associated with a destination of each data packet.

21. The system of claim 16, further comprising
means for receiving control information over the wireless communication link; and
means for receiving packets over the wireless communication link using the physical layer frame temporal duration and format defined by corresponding control information.

22. The system of claim 16, wherein the means for selecting a physical layer frame temporal duration and format comprises means for varying the temporal duration from frame to frame.

23. A wireless transmission system providing operational physical layer adaptation when using a layered protocol stack comprising:
a queue in communication with an upper layer of the protocol stack, the queue having a data packet input, wherein data packets provided to the data packet input each have an associated quality of service requirement specified by the upper layer;
a frame type selector coupled to the queue and configured to select a physical layer frame temporal duration and format based on the associated quality of service requirement of a data packet ready for output from the queue;
a transmitter coupled to the frame type selector and coupled to the queue, the transmitter configured to (i) transmit a control frame over a wireless communication link on a first wireless channel having a first frequency to define the selected physical layer frame format for the packet and (ii) transmit a data frame having the data packet included therein over the wireless communication link on a second wireless channel having a second frequency using the selected physical layer frame temporal duration and format for the packet.

24. The system of claim 23, wherein the control frames each include a synchronization field.

25. The system of claim 23, wherein the transmitter is capable of varying at least one of the following on a frame by frame basis: a modulation type, a modulation symbol rate, a forward error correction coding type, a forward error correction coding control size, an automatic repeat request retransmission type, an interleaving type, an interleaving size, a spreading code rate, and a spreading code format.

26. The system of claim 23, wherein corresponding control frames and data frames are separated by at least one intervening control frame and data frame.

27. The system of claim 23, further comprises a packet fragmentor coupled to the queue and configured to fragment packets into multiple data frames.

28. The system of claim 23, wherein the queue comprises a priority queue providing differing queue delay for packets as a function of the associated quality of service requirements.

* * * * *